United States Patent [19]
Hodges

[11] Patent Number: 5,746,106
[45] Date of Patent: May 5, 1998

[54] HIGH VOLUME MEAT PRODUCT INCISOR

[76] Inventor: Ralph S. Hodges, 2907 Shelter Island Dr., No. 105-205, San Diego, Calif. 92106

[21] Appl. No.: 784,155

[22] Filed: Jan. 15, 1997

[51] Int. Cl.[6] .............................. A23L 1/00; A47J 37/00; B26B 29/00; B26D 3/08
[52] U.S. Cl. .................... 83/884; 83/873; 83/876; 83/879; 99/388; 99/441; 99/537; 452/142; 452/148
[58] Field of Search ............................. 99/388, 534, 537, 99/485, 357, 441; 83/418, 440, 441, 870–887; 452/148, 198, 142, 143, 50; 30/289, 290, 278; 426/281, 323, 574, 513, 523, 264, 265, 383, 646, 104

[56] References Cited

U.S. PATENT DOCUMENTS

| | | | |
|---|---|---|---|
| 3,786,703 | 1/1974 | Piel | 83/882 |
| 3,902,388 | 9/1975 | New | 83/879 |
| 3,972,255 | 8/1976 | Irving, Jr. | 83/873 |
| 3,995,515 | 12/1976 | White | 83/873 |
| 4,002,091 | 1/1977 | White | 83/873 |
| 4,071,950 | 2/1978 | Telesio | 452/148 X |
| 4,118,828 | 10/1978 | Melanson | 452/50 |
| 4,414,707 | 11/1983 | Koken | 452/50 |
| 5,067,241 | 11/1991 | Goodman | 30/289 |
| 5,069,914 | 12/1991 | Gagliardi, Jr. | 426/104 X |
| 5,094,649 | 3/1992 | Hall | 452/50 |
| 5,185,172 | 2/1993 | Barkhau et al. | 99/388 X |
| 5,295,895 | 3/1994 | Klyce et al. | 99/537 |

*Primary Examiner*—Timothy F. Simone
*Attorney, Agent, or Firm*—Nydegger & Associates

[57] ABSTRACT

A device and method for superficially incising a sausage-like meat product includes a plurality of rotatable cutting elements which are arranged to define a chute therebetween. Each cutting element includes a cylinder and has a circular blade which projects radially from the cylinder. The centers of the respective blades, also located in the cylinder, define a base plane and the blades are all similarly tilted to rotate in tilt planes which are angled from the base plane. In the operation of the device, all cutting elements are simultaneously rotated and a meat product is inserted into the chute. Rotation of the cutting elements simultaneously causes the cylinder to draw the meat product through the chute and causes the blades on the cylinder to superficially cut a helical shaped incision into the meat product. The depth of the cuts are established by the projection of the blades, and the pitch of the helical incisions, can be controlled by the tilting of the cutting elements.

21 Claims, 2 Drawing Sheets

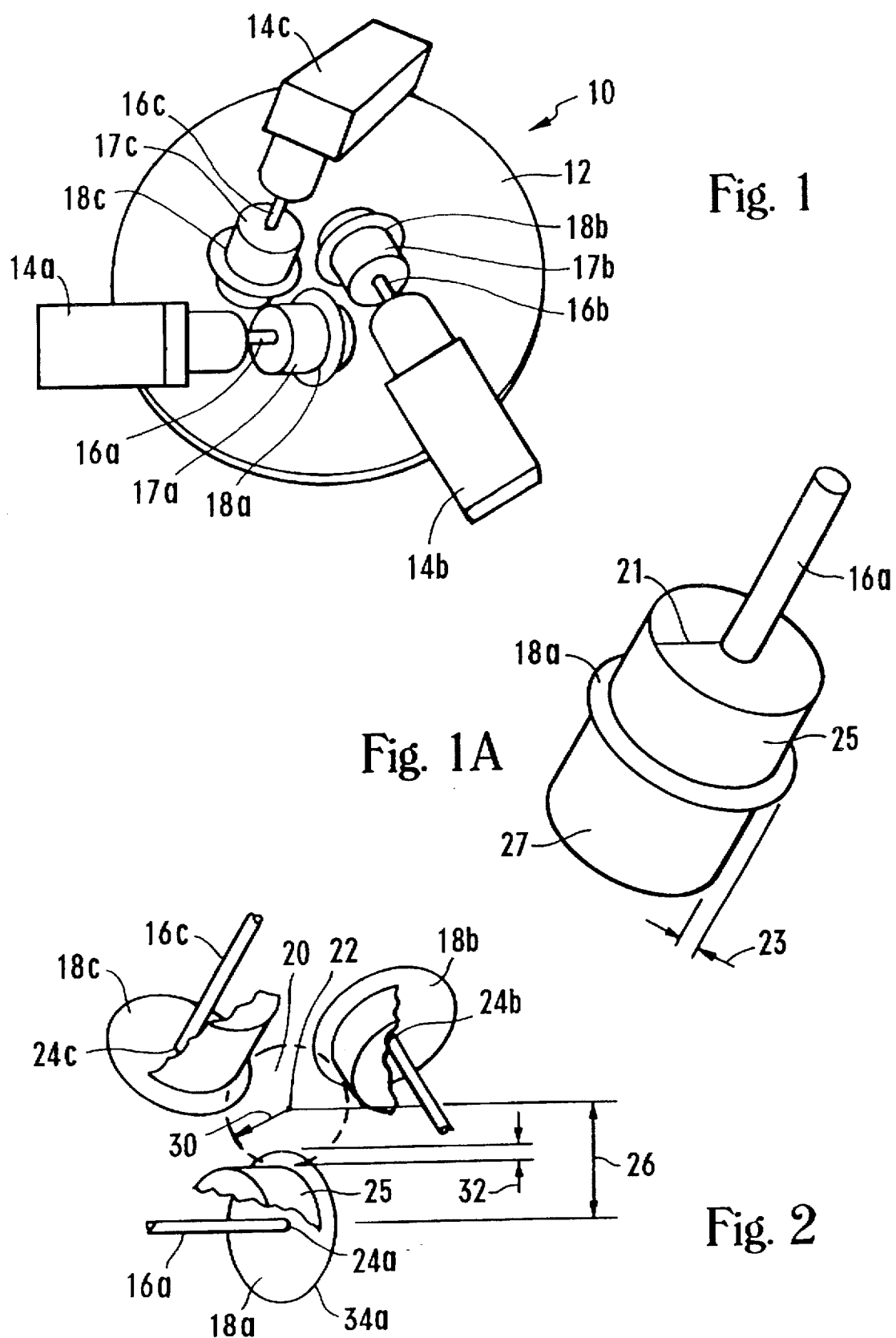

HIGH VOLUME MEAT PRODUCT INCISOR

FIELD OF THE INVENTION

The present invention pertains generally to meat cutlery. More specifically, the present invention pertains to meat cutting equipment which can continuously process a large volume of pre-process sausage like meat products. The present invention is particularly, but not exclusively, useful for superficially incising a hot dog, or other sausage type product, with a superficial helical shaped incision which improves and enhances the taste and cookability of the product.

BACKGROUND OF THE INVENTION

In the United States, hot dogs are a well known and widely used food staple. Literally, everyone has heard of, and at one time or another has most likely eaten, a hot dog. Not so well known, however, is the fact that superficial incisions into a hot dog can have several effects on the hot dog. These effects are both practical and aesthetic.

As a practical matter, incisions into the surface of a hot dog cause the hot dog to be cooked differently than it otherwise would be. For one thing, due to the incisions, the exposed surface of a superficially incised hot dog is increased. During cooking, this increased surface area causes heat to penetrate more quickly and deeper into the interior of the hot dog. This, in turn, promotes quicker and more even cooking of the hot dog. For health reasons, these effects of superficial incision may be very desirable. Additionally, while fat in a hot dog may be desirable for taste purposes; for the diet conscious, less fat than is normally present in a hot dog may be preferable. If so, superficial incisions into a hot dog will allow fat in the hot dog to be more easily drained away as the hot dog is being cooked. The result is a leaner hot dog.

In addition to the practical considerations associated with superficial incisions into a hot dog, aesthetic considerations also come into play. For many, incisions in the surface of a hot dog can be both eye-catching and entertaining. Further, superficial incisions can make the hot dog distinctive.

For high volume production of superficially incised hot dogs, it is clear that some device or apparatus is required. It is simply too time consuming and labor intensive to manually incise each and every hot dog in a high volume operation. Moreover, for many incision designs, it is extremely difficult to insure a uniform penetration depth for the incisions when they are made by hand. A superficial helical or spiral design on a hot dog is a case in point. In order to properly make a helical or spiral shaped design into the surface of a hot dog, it is necessary to rotate the hot dog during the cutting process. All the while, the pitch of the spiral incision must be maintained constant, and the penetration depth of the cut must be uniform. Doing all of this manually can be very exacting and tiresome.

Despite the difficulties to be encountered and overcome when establishing a high volume production operation for the superficial incisions of hot dogs, the practical and aesthetic advantages to be obtained can make the effort worthwhile. Further, while the discussion thus far has specifically considered the hot dog as a candidate for superficial incisions, it is to be appreciated that any sausage-like meat is suitable for consideration.

In light of the above, it is an object of the present invention to provide a device and a method which can superficially incise prepared meat products, such as hot dogs, on a high volume basis. It is another object of the present invention to provide a device and a method for superficially incising prepared meat products with a helical or spiral design which establishes a constant pitch for the spiral pattern and which insures a uniform penetration depth for the incision. Yet another object of the present invention is to provide a device for superficially incising prepared meat products which is easy to manufacture, simple to use, and comparatively cost effective.

SUMMARY OF THE INVENTION

A device for superficially incising a sausage-like meat product includes three cutting elements which are arranged to define a chute or passageway between the elements. Further, each cutting element includes a cylindrical shaped body which has the cutting edge of a circular blade projecting radially therefrom. The location of the blade is such that the blade divides the cylinder into rollers which are on either side of the blades. More specifically, the centers of the circular blades, which are also on the central longitudinal axis of the cylinder, lie in a base plane that is generally perpendicular to the longitudinal axis of the chute. Further, each of the cutting elements is individually inclined relative to the base plane for rotation of its blade in a respective tilt plane. Still further, the tilt planes are established separately for each blade such that a line, between the center of each rotatable blade and a point on the chute axis, lies in the respective tilt plane and is substantially perpendicular to the chute axis. Preferably, the angles of inclination between the base plane and the respective tilt planes are equal to each other and are in a range of from ten to forty five degrees.

For the device of the present invention, each cutting element and its respective blade is rotated by a drive motor, and the center of each blade is located equidistant from the chute axis. In a preferred embodiment there are three cutting elements, and the distance of the blades from the chute axis can be varied to accommodate sausage-like meat products having different diameters. It is the projection of the blades from the cylindrical portion of the cutting elements that controls the incision depths of the blades into the meat product.

In the operation of the device of the present invention, the cutting elements are positioned to establish a desired chute diameter for the particular meat product. As indicated above, this is accomplished by adjusting the positions of the cutting elements relative to the chute that is established between the cutting elements. Further, the angle of inclination between the respective tilt planes and the base plane can be varied. With this adjustment, the pitch of the resulting helical or spiral design that is cut into the surface of the meat product can be established as desired. The drive motors are then activated to rotate the respective cutting elements. With the cutting elements rotating, the meat product is inserted into the chute. By the action of the rotating cylindrical rollers of the cutting element the meat product is drawn through the chute. Simultaneously, the blades on the cutting elements make helical or spiral incisions into the surface of the meat product. As intended for the device of the present invention, a continuous input of meat product can be fed into the chute.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 1 is a perspective view of the device of the present invention as seen from above and from the front of the device;

FIG. 1A is a perspective view of a cutting element of the device;

FIG. 2 is a top plan view of the blade arrangement of the device, with portions of the cylinders removed for clarity;

DESCRIPTION OF THE PREFERRED EMBODIMENT

Figure 3:
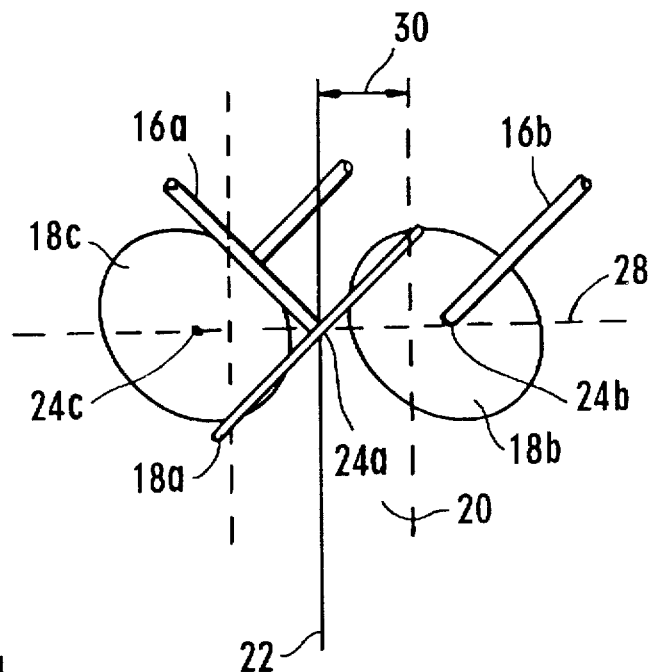
FIG. 3 is a front elevational view of the blade arrangement of the device with portions of the cylinders removed for clarity.

Referring initially to FIG. 1, a device in accordance with the present invention is shown and is generally designated 10. As shown in FIG. 1, the device 10 includes a base 12 on which are mounted a plurality of drive motors. The three particular drive motors 14a–c which are shown are only exemplary and, it is to be appreciated that fewer or more drive motors can be used. Preferably, the device 10 uses three drive motors 14a–c. As shown in FIG. 1, a drive shaft 16a–c is mounted on a respective drive motor 14a–c, and a respective cutting element 17a–c is attached to a respective drive shaft 16a–c. As also shown, each cutting elements 17a–c is formed with a circular blade 18a–c which projects radially from the element 17a–c. Thus, each cutting element 17a–c and its respective blade 18a–c is mounted on the device 10 for selective rotation by the connected drive motor 14a–c about a blade axis which is generally defined by the particular drive shaft 16a–c.

In FIG. 1A, the cutting element 17a is shown as being representative of all the cutting elements 17a–c. There it will be seen that the cutting element 17a includes a cylindrical shaped body 19 which has a radius 21 and a longitudinal axis that is generally coaxial with drive shaft 16a. The blade 18a projects radially from the body 19 through a distance 32. As positioned on the body 19, the blade 18a divides the cutting element 17a into a roller 25 and a roller 27 which together straddle the blade 18a. The intended spatial relationship between the different cutting elements 17a–c and circular blades 18a–c of device 10 is, perhaps, best appreciated by referring to both FIGS. 2 and 3.

By cross referencing FIG. 2 with FIG. 3 it can be appreciated that the cutting elements 17a–c and the blades 18a–c are arranged to establish a chute 20 therebetween, and that this chute 20 is generally defined by a longitudinal axis 22. Further, the respective blade center 24a–c for each of the circular cutting blades 18a–c is located at a distance 26 from the axis 22. As specifically shown in FIG. 3, the three blade centers 24a–c define a base plane 28 which is oriented substantially perpendicular to the axis 22.

For the purposes of the present invention, it is to be appreciated that the cutting elements 17a–c and the blade centers 24a–c of respective blades 18a–c are moveable relative to axis 22 to vary the distance 26. Referring to FIG. 1A and FIG. 2, and using the circular blade 18a as an example, it can be seen that for a given chute radius 30, movements of blade centers 24a–c which change the distance 26 will also vary the chute radius 30. Specifically, the chute radius 30 is equal to the distance from the surface of roller 25 to the axis 22. Once the chute radius 30 is established, the incision depth to which the cutting edge 34a of blade 18a extends into chute 20 will be equal the distance 32 by which the blade 18a projects from body 19.

Figure 4A:
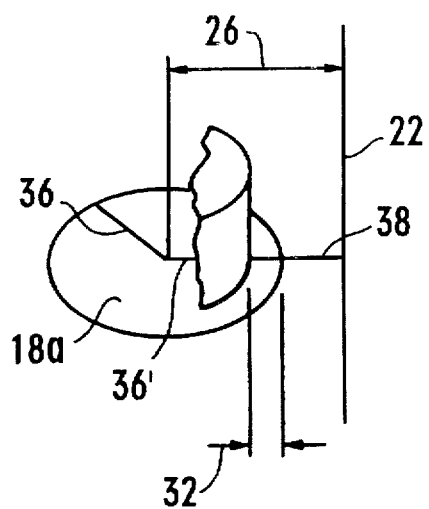
FIG. 4A is a side elevational view of a single blade of a cutting element with portions of cylinders removed for clarity, with the blade oriented relative to a defined axis.
Figure 4B:
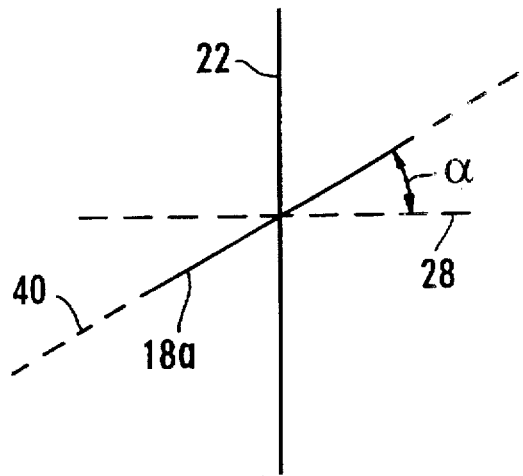
FIG. 4B is a front elevational view of the single blade orientation shown in FIG. 4A shown from a perspective that is changed 90° from the perspective used in FIG. 4A.

The exact orientation of the plurality of individual cutting elements 17a–c, and their circular blades 18a–c, relative to chute axis 22 can be further appreciated with reference to FIG. 4A and FIG. 4B. Again, circular blade 18a is used as an example. In FIG. 4A it is seen that the blade 18a has a radius 36. Importantly, one particular radius 36' is seen to lie along a line 38 which is substantially perpendicular to the chute axis 22. Also, it happens that the radius 36' and the line 38 both lie in the base plane 28. Now, looking at the blade 18a at a 90° angle (FIG. 4B) from the view of FIG. 4A, it is seen that the blade 18a lies in a tilt plane 40 which is inclined at an angle α relative to the base plane 28. Preferably, the angle α is in the range of from ten to forty five degrees (10°–45°) Although blade 18a has been individually considered here, the same geometrical description applies equally to the blades 18b and 18c.

In sum, all of the cutting elements 17a–c of device 10 are arranged to establish the chute 20. Within this arrangement, the centers 24a–c of the blades 18a–c all lie in the base plane 28 and each of the centers 24a–c is located at a distance 26 from the chute axis 22. Additionally, each blade 18a–c is inclined at an angle α relative to base plane 28 to position the blade 18a–c in a tilt plane 40.

OPERATION

In the operation of the device 10 of the present invention, a sausage-like meat product, such as a hot dog, is selected. The size (radius, not length) of the hot dog then determines the magnitude of the chute radius 30 that is to be used. As can be readily appreciated, the radius of the hot dog is equal to the radius 30 of chute 20. Having determined the length of the chute radius 30, the distance 26 of each center 24a–c from chute axis 22 is then varied to establish a desired incision depth 32. As is to be appreciated here, the size of the meat product controls and the cutting elements 17a–c are adjusted so that while the meat product is in the chute 40, the rollers 25, 27 urge against the meat product. Additionally, the inclination angle α is set for each of the blades 18a–c.

Once the distances 26 and the angles α have been set for each of the cutting elements 17a–c and their respective circular blades 18a–c, the drive motors 14a–c are activated. Activation of the drive motors 14a–c then cause the cutting elements 17a–c to rotate in their respective tilt planes 40. While the cutting elements 17a–c are rotating, a hot dog is inserted into the chute 20. In accordance with the intentions of the present invention, the action of the rotating cutting elements 17a–c on the hot dog accomplishes two functions. First, the rotating rollers 25, 27 begin to spin the hot dog and draw the hot dog through the chute 20. Second, the blades 18a–c make superficial incisions into the hot dog having an incision depth 32.

Figure 5:
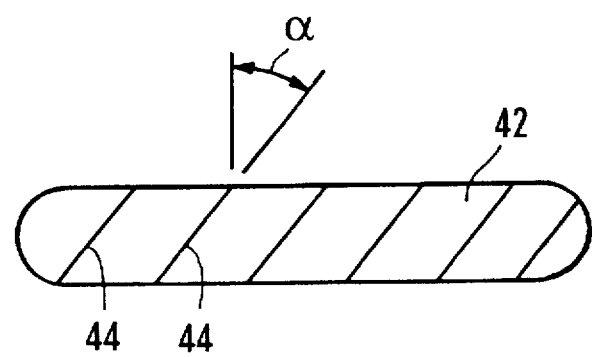
FIG. 5 is a sausage-like meat product (a hot dog) after superficial incisions have been made with the device of the present invention.

FIG. 5 shows a product which results from the operation of device 10. Specifically, the superficially incised hot dog 42 which is prepared by device 10 has a spiral or helical design 44 which is cut into the surface of the hot dog 42. As is noted in FIG. 5, the pitch of this spiral design 44 is substantially equal to the inclination angle α that is set for the blades 18a–c. As will be appreciated by the skilled artisan, the angle α can be varied to give either a positive or a negative pitch to the design 44.

While the particular High Volume Meat Product Incisor as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A device for superficially incising a sausage-like meat product which comprises:

a base;

a plurality of cutting elements each said cutting element including a cylinder and having a circular blade with a cutting edge extending radially therefrom, said blade defining a blade center and, said cutting edge being distanced from said center by a radius, said plurality of cutting elements being positioned to establish a chute therebetween for concertedly incising the meat product with respective said cutting edges as the meat product passes through said chute, said chute defining a chute axis; and a drive means mounted on said base and attached to said respective cutting elements for rotating said cutting elements about a blade axis, said plurality of blade centers being located in a base plane with said base plane being substantially perpendicular to said chute axis and each said blade axis being inclined relative to said base plane with one said radius substantially perpendicular to said chute axis.

2. A device as recited in claim 1 wherein all said cutting elements are simultaneously rotatable in said respective tilt planes.

3. A device as recited in claim 1 wherein each said blade axis is inclined at an angle relative to said base plane and wherein said angle is in a range of from approximately ten degrees to approximately forty five degrees.

4. A device as recited in claim 3 wherein all said angles for said respective blade axes are the same.

5. A device as recited in claim 1 comprising three said cutting elements.

6. A device as recited in claim 5 wherein each said center of a respective said cutting element is equidistant from said center of said other cutting elements.

7. A device as recited in claim 6 wherein all said cutting elements have substantially a same said radius and said centers of said cutting elements are distanced less than two radii from each other.

8. A device as recited in claim 6 further comprising adjustable means for varying said equidistance between said centers of said circular blades.

9. A device as recited in claim 1 wherein said drive means comprises:

a respective drive shaft attached to each said cutting elements; and a respective motor for rotating each said drive shaft.

10. A device for superficially incising a sausage-like meat product which comprises:

a base member defining a base plane;

a plurality of cutting elements, each said cutting element having a blade with said blade being mounted on said base member for rotation in a respective tilt plane, each said tilt plane being inclined at an angle relative to said base plane and said plurality of cutting elements being positioned to establish a chute therebetween, said chute defining a longitudinal axis substantially perpendicular to said base plane and each said blade having a radius in said base plane substantially perpendicular to said chute axis; and drive means mounted on said base member for simultaneously rotating said plurality of cutting elements to draw the meat product through said chute and to concertedly incise the meat product as the meat product passes through said chute.

11. A device as recited in claim 10 wherein said angle is in a range of from approximately ten degrees to approximately forty five degrees.

12. A device as recited in claim 11 wherein all said angles for said respective tilt planes are the same.

13. A device as recited in claim 10 comprising three said cutting elements.

14. A device as recited in claim 13 wherein each said blade has a center located in said base plane and said center of each respective said blade is equidistant from said center of said other blades.

15. A device as recited in claim 14 wherein all said blades have substantially a same radius and said centers of said blades are distanced less than two radii from each other.

16. A device as recited in claim 15 further comprising adjustable means for varying said equidistance between said centers of said blades.

17. A device as recited in claim 14 wherein said drive means comprises:

a plurality of drive shafts, each said drive shaft being attached to a respective said cutting element; and a plurality of motors, each motor being attached to one said drive shaft for rotating said drive shaft and respective said cutting element.

18. A method for superficially incising a sausage-like meat product which comprises the steps of:

providing a device having a base member defining a base plane, a plurality of cutting elements, each said cutting element having a blade with said blade being mounted on said base member for rotation in a respective tilt plane with each said tilt plane being inclined at an angle relative to said base plane and said plurality of cutting elements being positioned to establish a chute therebetween, said chute defining a chute axis substantially perpendicular to said base plane and each blade having a radius substantially perpendicular to said chute axis, and a drive means mounted on said base member for simultaneously rotating said plurality of cutting elements to draw the meat product through the chute and concertedly incise the meat product with a helical design as the meat product passes through said chute;

activating said drive means to rotate said cutting elements; and inserting a meat product into said chute.

19. A method as recited in claim 18 wherein each said cutting element includes a cylinder with a circular blade projecting radially therefrom, and wherein said blade has a center located in said base plane and said method further comprises the step of positioning said centers to control an incision depth for said blades into the meat product.

20. A method as recited in claim 19 wherein said device uses three cutting elements.

21. A method as recited in claim 18 further comprising the step of varying the inclination of said angle between said tilt plane and said base plane to establish a pitch for said helical design.

* * * * *